(12) United States Patent
Xu et al.

(10) Patent No.: US 8,975,879 B2
(45) Date of Patent: Mar. 10, 2015

(54) SWITCHING CONVERTER HAVING A PLURALITY N OF OUTPUTS PROVIDING N OUTPUT SIGNALS AND AT LEAST ONE INDUCTOR AND METHOD FOR CONTROLLING SUCH A SWITCHING CONVERTER

(75) Inventors: Weiwei Xu, Shanghai (CN); Zhiliang Hong, Shanghai (CN); Dirk Killat, Cottbus (DE)

(73) Assignees: Dialog Semiconductor GmbH, Kirchheim/Teck-Nabern (DE); State-Key Laboratory of ASIC & System, Fudan University, Shanghai (CN)

( * ) Notice: Subject to any disclaimer, the term of this patent is extended or adjusted under 35 U.S.C. 154(b) by 219 days.

(21) Appl. No.: 12/807,682

(22) Filed: Sep. 10, 2010

(65) Prior Publication Data

US 2011/0068757 A1    Mar. 24, 2011

Related U.S. Application Data

(60) Provisional application No. 61/242,182, filed on Sep. 14, 2009.

(51) Int. Cl.
*H02M 3/158* (2006.01)
*H02M 1/00* (2006.01)

(52) U.S. Cl.
CPC ........ *H02M 3/158* (2013.01); *H02M 2001/009* (2013.01)
USPC ............................ 323/267; 323/259; 323/268

(58) Field of Classification Search
CPC ........ G05F 1/613; G05F 1/577; H02M 3/158; H02M 3/1588; H02M 2001/009; H02M 3/33561; H02M 3/155; H02M 2001/0045; H02M 3/1584; H02M 3/156
USPC ......... 323/223–225, 267, 268, 271, 282, 283, 323/351
See application file for complete search history.

(56) References Cited

U.S. PATENT DOCUMENTS

| 6,204,651 | B1* | 3/2001 | Marcus et al. | 323/283 |
| 2004/0201281 | A1* | 10/2004 | Ma et al. | 307/38 |

(Continued)

OTHER PUBLICATIONS

"Digital Control of Single-Inductor Dual-Output dc-dc Converters in Continuous-Conduction Mode," by Mattavelli et al., Power Electronics Specialists Conference, Jun. 16, 2005, pp. 2616-2622.

(Continued)

*Primary Examiner* — Jeffrey Sterrett
*Assistant Examiner* — Gustavo Rosario Benitez
(74) *Attorney, Agent, or Firm* — Saile Ackerman LLC; Stephen B. Ackerman

(57) ABSTRACT

This invention provides a switching converter having a plurality N of outputs providing N output signals and at least one inductor, comprising a first controlling device for controlling the total energy flowing over the inductor to the N outputs dependent on a first control signal, at least a second controlling device for distributing the total energy between the N outputs by means of at least a second control signal, wherein the first controlling device is coupled to all N outputs for receiving a number M of the respective feedback output signals of the N outputs, M≤N, wherein the first controlling device comprises first means for weighting the M feedback output signals and second means for providing the first control signal dependent on the weighted M feedback output signals.

22 Claims, 13 Drawing Sheets

Integrated on chip

(56) References Cited

U.S. PATENT DOCUMENTS

| | | | |
|---|---|---|---|
| 2005/0088160 A1* | 4/2005 | Tanaka et al. | 323/284 |
| 2006/0092676 A1* | 5/2006 | Liptak et al. | 363/56.02 |
| 2007/0075689 A1* | 4/2007 | Kinder et al. | 323/259 |
| 2007/0182391 A1* | 8/2007 | Chapuis et al. | 323/282 |
| 2007/0262760 A1* | 11/2007 | Liu | 323/282 |
| 2008/0116979 A1* | 5/2008 | Lesso et al. | 330/297 |
| 2008/0304349 A1* | 12/2008 | Suzuki et al. | 365/226 |
| 2010/0039080 A1* | 2/2010 | Schoenbauer et al. | 323/234 |

OTHER PUBLICATIONS

"A 4-Output Single-Inductor DC-DC Buck converter with Self-Boosted Switch Drivers and 1.2A Total Output Current," by M. Belloni et al., 2008 IEEE. Int'l Solid-State Circuits Conference, ISSCC 2008/Session 24/Analog Power Techniques/24.6, Feb. 3, 2008, pp. 444-445, 626.

"Design of Single-Inductor Dual-Output Switching Converters with Average Current Mode Control," by Weiwei Xu et al., Circuits and Systems, IEEE Nov. 30, 2008, pp. 902-905.

"Single-Inductor Multiple-Output Switching Converters With Time-Multiplexing Control in Discontinuous Conduction Mode," by Donsheng Ma et al. IEEE Journal of Solid-State Circuts, vol. 38, No. 1, Jan. 2003, pp. 89-100.

"A Pseudo-CCM/DCM SIMO Switching Converter With Freewheel Switching," by Donsheng Ma et al., IEEE Journal of Solid-State Circuits, vol. 38, No. 6, Jun. 2003, pp. 1007-1014.

"A Single-Inductor Switching DC-DC Converter With Five Outputs and Ordered Power-Distributive Control," by Hanh-Phue Le et al., IEEE Journal of Solid-State Circuits, vol. 42, No. 12, Dec. 2007, pp. 2706-2714.

"Lossless Current Sensing in Low-Voltage High-Current DC/DC Modular Supplies," by Enrico Dallago et al., IEEE Transactions on Industrial Electronics, vol. 47, No. 6, Dec. 2000, pp. 1249-1252.

"A Dual-Mode Single-Inductor Dual-Output Switching Converter With Small Ripple," by Weiwei Xu et al., IEEE Transactions on Power Electronics, vol. 25, No. 3, Mar. 2010, pp. 614-623.

* cited by examiner

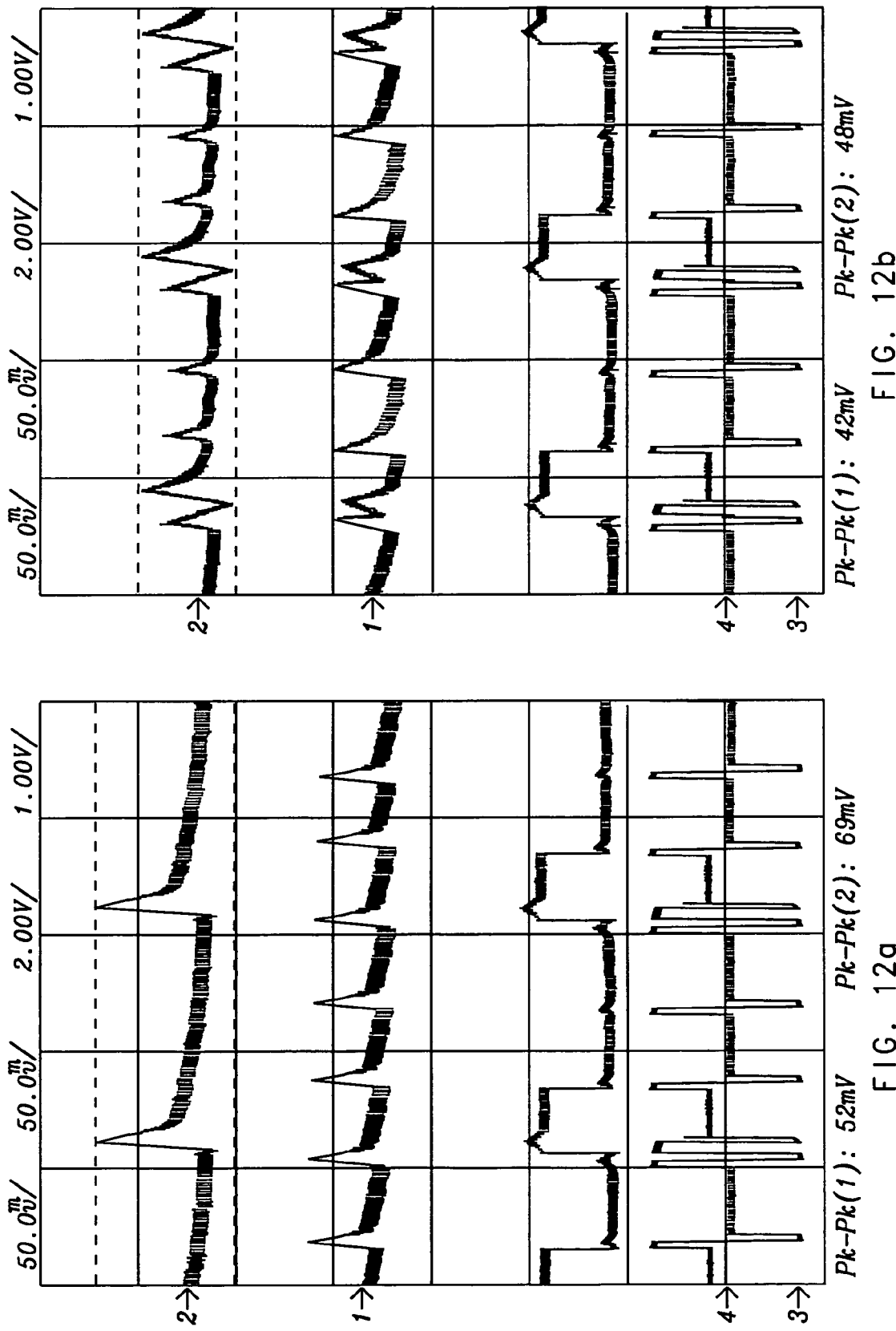

SWITCHING CONVERTER HAVING A PLURALITY N OF OUTPUTS PROVIDING N OUTPUT SIGNALS AND AT LEAST ONE INDUCTOR AND METHOD FOR CONTROLLING SUCH A SWITCHING CONVERTER

This application claims benefit under 35 U.S.C. §119 to U.S. Provisional Patent Application Ser. No. 61/242,182, filed on Sep. 14, 2009, which is herein incorporated by reference in its entirety

TECHNICAL FIELD

The present invention relates to a switching converter having a plurality N of outputs providing N output signals and at least one inductor and to a method for controlling such a switching converter. In particular, the present invention relates to a single-inductor dual-output switching converter with low ripples and improved cross regulation.

BACKGROUND

Portable applications usually need different supply voltages for different functional modules to minimize power consumption. A more interesting and efficient solution is to use one converter with a single inductor to generate multiple outputs, which reduces the external components and saves cost.

There have been several kinds of single-inductor multiple-output (SIMO) switching converters reported in recent years. The converters in references [1] and [2] make use of time-multiplexing control, which suffer from large current ripples and dissipate energy during the freewheeling state. The solution in [3] employs the ordered power-distributive control which has a main channel for compensation and other sub-channels controlled just by comparators. This simplifies the control loop, but has larger ripples and is only suited for small load currents. The converter in [5] works in Continuous Conduction Mode (CCM) and adopts several Pulse Width Modulation (PWM) controllers driven by suitable linear combinations of output errors, which can sustain large load currents, but has large ripples (150 mV) and serious cross regulation (120 mV) problems. So, the existing SIMO converters realize multiple-output with some parasitic effects:

- Load currents are limited by the intrinsic requirement of Discontinuous Conduction Mode (DCM) and pseudo-CCM (PCCM) control.
- Large ripples and spikes, resulting from discontinuous current change on filter capacitors with parasitic series inductors.
- Cross regulation: the SIMO converter can be regarded as a multi-input multi-output system with cross regulation items.
- Efficiency: more switches added in the power path result in more power loss. The efficiency gets worse especially under light loads.

In the following, considerations on SIDO switching converters are given.

A. Power Stage and Control Sequence

A conventional buck converter consists of two power switches and one inductor, which provide high efficiency power conversion. A dual-output converter is achieved by adding another two switches at the output node of the inductor, which is shown in FIG. 1. Hereby, a switch S1 switches the VLX1 terminal of the inductor L to the input voltage source Vg and a switch S2 switches the VLX1 node alternatively to ground GND. The switches S1 and S2 are controlled via signal D1.

Switches S3 and S4 are controlled via signal D2 and connect one selected output node each, i.e. V1 or V2, to the second VLX2 terminal of the inductor L.

Output capacitors C1 and C2 are charged during the phases, where the terminal VLX2 is connected to the respective output terminals, i.e. V1 or V2, and are discharged via the output load, including R1 and R2, during the phases where the respective output node is not connected to the terminal VLX2.

FIG. 2 illustrates the control sequence and the waveforms of the steady-state inductor current and output ripples in CCM. iL is a detail view of the inductor current flowing from node VLX1 to node VLX2, D1 and D2 are the control signals as shown in FIG. 1. If D1 is high, S1 is closed and S2 is opened (and vice versa), if D2 is high, S3 is closed and S4 is opened (and vice versa).

V1 and V2 are detail views of the resulting voltages at the V1 and V2 output nodes that properties will be described in more detail under "C. Ripples".

Differing from the comparator-based distributive structure in [3], the controller here employs both PWM generators on control signal D1 and D2, which has the advantage of large load currents and comparatively low ripples. However, as pointed out in [1], there may occur serious cross regulation problems.

B. Cross Regulation

In a SIMO converter, variation of load current on one channel will affect the others, for all outputs that share a single inductor. This is the cross regulation problem, which is one of the severest challenges in SIMO converter design. To solve this problem, the converters in [1] and [2] work in DCM or PCCM with a freewheeling state of inductor current, which makes two channels independent of each other. However, this method is not suitable for the SIDO converter in CCM.

The converter in [4] regulates the common-mode voltage ($V_{CM}=(V_1+V_2)/2$) and the differential-mode voltage ($V_{DM}=V_1-V_2$) instead of two outputs to partly suppress the cross regulation. As shown in FIG. 3, there are two main control loops in the system: the common-mode loop which regulates the total energy by $D_1$, and the differential-mode loop which distributes the energy in the inductor by $D_2$. It has been analyzed in [4] that the transfer functions $G_{21}(s)$ and $G_{12}(s)$ represent for the cross regulation items.

Based on the idea of decomposing this cross regulated multi-loop system into several single-loop sub-systems with weak interactions, a further adaptive common-mode control method is proposed. Here, $V_{CM}$ is adjusted according to the load currents, which can be expressed as:

$$V_{CM}=D_2V_1+(1-D_2)V_2. \quad (1)$$

The weighted coefficient of each channel is proportional to the load current. It is reasonable that the channel which draws more current should have a larger impact on the regulation of inductor current. According to the control sequence in FIG. 2 and assuming the ripples are negligible, the small signal behavior of the SIDO power stage in FIG. 1 can be described by state space equations as:

$$\frac{d}{dt}\begin{bmatrix} v_1 \\ v_2 \\ i_L \end{bmatrix} = \begin{bmatrix} -1/R_1C_1 & 0 & D_2/C_1 \\ 0 & -1/R_2C_2 & (1-D_2)/C_2 \\ -D_2/L & -(1-D_2)/L & 0 \end{bmatrix}\begin{bmatrix} v_1 \\ v_2 \\ i_L \end{bmatrix} + \quad (2)$$

-continued $$\begin{bmatrix} 0 & I_L/C_1 \\ 0 & -I_L/C_2 \\ V_g/L & (V_2 - V_1)/L \end{bmatrix} \begin{bmatrix} d_1 \\ d_2 \end{bmatrix}$$

$$\begin{bmatrix} v_{CM} \\ v_{DM} \end{bmatrix} = \begin{bmatrix} m_1 D_2 & m_2(1-D_2) & 0 \\ m_1 & -m_2 & 0 \end{bmatrix} \begin{bmatrix} v_1 \\ v_2 \\ i_L \end{bmatrix} + \begin{bmatrix} 0 & m_1 V_1 - m_2 V_2 \\ 0 & 0 \end{bmatrix} \begin{bmatrix} d_1 \\ d_2 \end{bmatrix}$$

where m1 and m2 are additional output voltage feedback coefficients (i.e. Vfb1=m1*V1, Vfb2=m2*V2), as referred to in later figures.

Within the state space equations (2), small letters (i.e. v1, d1) refer to the small signal time dependent properties and are functions of time, wherein capital letters (i.e. V1, D1), refer to the absolute (i.e. large signal) values.

The transfer functions of power stage can be solved from equations (2). The bode plot comparison of G12(s) in FIG. 4 shows that the proposed adaptive common-mode control has about 20 dB improvement on the suppression of cross regulation in low frequency (when Vg=4 V, R1=3, R2=90Ω).

C. Ripples

A SIDO buck converter has larger output ripples than a conventional buck converter especially under heavy loads, for the current ripples of filter capacitors in SIDO converters are the total load currents. As shown in FIG. 2, the output ripples mainly consist of two parts: the charge of filter capacitors and the voltage drop on the equivalent series resistor (ESR) of capacitor.

Hereby, V1 and V2 show respective detail views of the voltages at the V1 and V2 output nodes. The voltage steps at the transition times of D2 need to be seen in conjunction with the equivalent series resistors (ESR) of the output capacitors C1 and C2 when the respective capacitors change between charging and discharging operation and vice versa, wherein the time proportional increase and decrease in the output voltages between this voltage steps is affiliated with the actual charging and discharging operation of the output capacitors.

When the inductor current switches to one channel, the filter capacitor is charged while the other is discharged. So, the ripples of two outputs are always in inverse phase.

Another serious problem is large spikes, which are caused by the rapid current change on the equivalent series inductors (ESLs) of filter capacitors when switching S3 and S4. They are even larger than output ripples in SIDO converters (e.g. about 100 mV in [6]).

FIG. 5 shows the output section of the power stage (see FIG. 1) together with a visualization of the origin of switching spikes as well as the proposed enhanced SIDO structure by adding an additional fly capacitor Cf.

As shown in FIG. 5, when the inductor current switches between two outputs, there occur large undershoot and overshoot spikes on filter capacitors.

Based on the conclusion that the ripples and spikes of two outputs are inverse-phased, a fly capacitor across two outputs can be added to reduce the steady state ripples. The value of the fly capacitor needs to be careful selected, since it provides an AC path between two outputs, which would deteriorate the performance of cross regulation. Analysis and simulation show that $C_f=0.1C_1$ is a good trade-off between ripples and cross regulation (e.g. for C1=C2).

SUMMARY

According to an aspect of the invention, a switching converter is provided having a plurality N of outputs providing N output signals and at least one inductor, comprising:

a first controlling device for controlling the total energy flowing over the inductor to the N outputs dependent on a first control signal, at least a second controlling device for distributing the total energy between the N outputs by means of at least a second control signal, wherein the first controlling device is coupled to all N outputs for receiving a number M of the respective feedback output signals of the N outputs, M≤N, wherein the first controlling device comprises first means for weighting the M feedback output signals and second means for providing the first control signal dependent on the weighted M feedback output signals.

According to an embodiment, the switching converter comprises one single inductor.

According to a further embodiment, the first controlling device is a common mode controller and the second controlling device is a differential mode controller.

According to a further embodiment, the first means are adapted to weight the M feedback output signals by means of the at least one second control signal.

According to a further embodiment, the first means are adapted to weight the M feedback output signals by means of at least one output current of a respective output signal.

According to a further embodiment, the first means are adapted to weight the M feedback output signals by means of M output currents of the M output signals.

According to a further embodiment, the first means are adapted to weight the M feedback output signals by means of the at least one second control signal and of at least one output current of a respective output signal.

According to a further embodiment, a coupling capacitor is coupled between two respective outputs of a number T of selected outputs of the plurality N outputs, T≤N, such that the two respective outputs have reverse ripples and spikes.

According to a further embodiment, the switching converter has two outputs providing N output signals, N=2, wherein a coupling capacitor is coupled between the two outputs, wherein the switching of the two outputs is inverse-phased.

According to a further embodiment, controllable coupling capacitors are arranged between two respective outputs, which to be controlled effective during phases of inverse switching.

According to a further embodiment, said respective coupling capacitor is controllable in a resistive manner, in particular by a switch.

According to a further embodiment, said first means are configured to weight the respective feedback output signal of the M feedback output signals in dependence on the respective length of a time period in which the respective output providing said respective feedback output signal is connected to the inductor.

According to a further embodiment, said first means are configured to weight the M feedback output signals by using adjustable resistors arranged in a feedback path between said outputs and said first controlling device. Said adjustable resistors are particularly embodied as controllable resistors.

According to a further embodiment, said first means are configured to weight the M feedback output signals by using at least one transfer function.

According to a further embodiment, said transfer function is a linear transfer function, a quadratic transfer function, an exponential transfer function or a square route transfer function. Further, said transfer function may be a combination of these functions.

According to a further embodiment, said transfer function is controlled via at least one second control signal.

According to a further embodiment, said transfer function is controlled via at least one output current of a respective output signal.

According to a further embodiment, said transfer function is controlled in dependence on a respective length of a time period in which the respective output providing said output signal is connected to the inductor.

According to a further embodiment, said transfer function is controlled in dependence on a respective length of a time period in which a different output as the respective output providing said output signal is connected to the inductor.

According to further aspect of the invention, a method is provided for controlling a switching converter having a plurality N of outputs providing N output signals and at least one inductor. The method has the steps of controlling the total energy flowing over the inductor to the N outputs by means of a first controlling device dependent on a first control signal, distributing the total energy between the N outputs by means of at least a second controlling device and of at least a second control signal, receiving a number M of feedback output signals of the N output signals, M≤N, by means of the first controlling device, weighting the M feedback output signals, and providing the first control signal dependent on the weighted M feedback output signals Further features of the method may be directly derived from the features of the switching converter.

According to a further aspect of the invention, a switching converter is provided having a plurality N of outputs providing N output signals and at least one inductor, comprising a first controlling device for controlling the total energy flowing over the inductor to the N outputs dependent on a first control signal, at least a second controlling device for distributing the total energy between the N outputs by means of at least a second control signal, wherein the first controlling device is coupled to all N outputs for receiving a respective feedback output signal and wherein the first controlling device comprises first means for weighting the N feedback output signals and second means for providing the first control signal dependent on the weighted N feedback output signals.

According to a further aspect of the invention, a switching converter is provided having a plurality N of outputs providing N output signals and at least one inductor, comprising:
a first controlling device for controlling the total energy flowing over the inductor to the N outputs dependent on a first control signal,
at least a second controlling device for distributing the total energy between the N outputs by means of at least a second control signal,
wherein the first controlling device is coupled to all a number M of the N outputs for receiving a respective feedback output signal, M≤N,
wherein the first controlling device comprises first means for weighting the M feedback output signals and second means for providing the first control signal dependent on the weighted M feedback output signals.

The first controlling device may use the output signals of all N outputs (M=N). Further, the first controlling device may use the output signals of a subset M of the N outputs (M<N).

BRIEF DESCRIPTION OF THE DRAWINGS

FIG. 12 shows PFM mode measured waveforms of output ripples and nodes VLX1 and VLX2 at light loads $I_1$=33 mA, $I_2$=10 mA, FIG. 12(a) without $C_f$, FIG. 12(b) with $C_f$;

DETAILED DESCRIPTION

Figure 1:
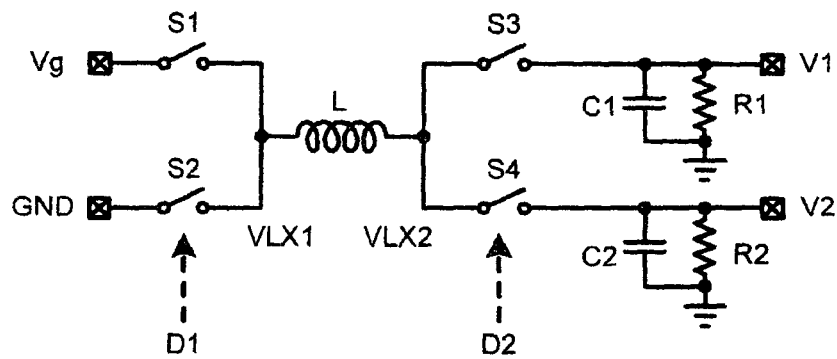
FIG. 1 shows a power stage structure of a SIDO buck converter.
Figure 2:
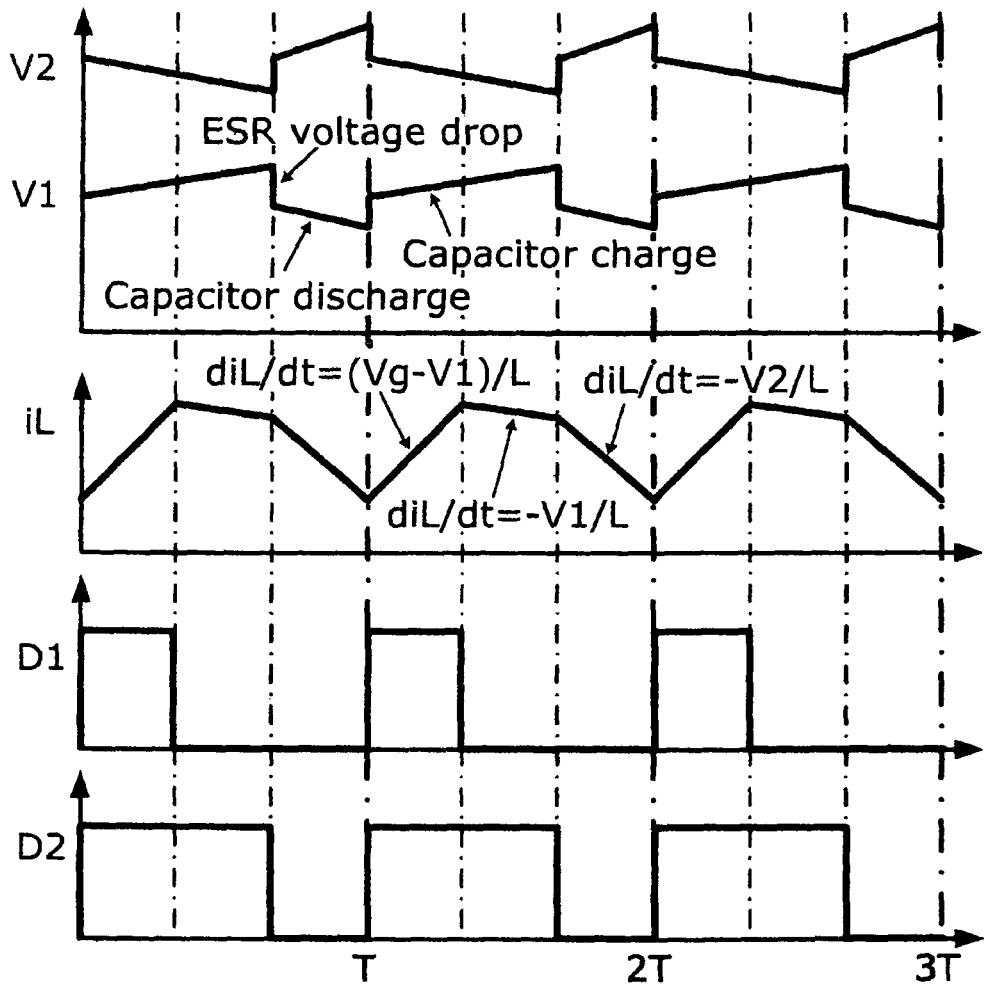
FIG. 2 shows waveforms of output ripples and inductor current with control signals.
Figure 3:
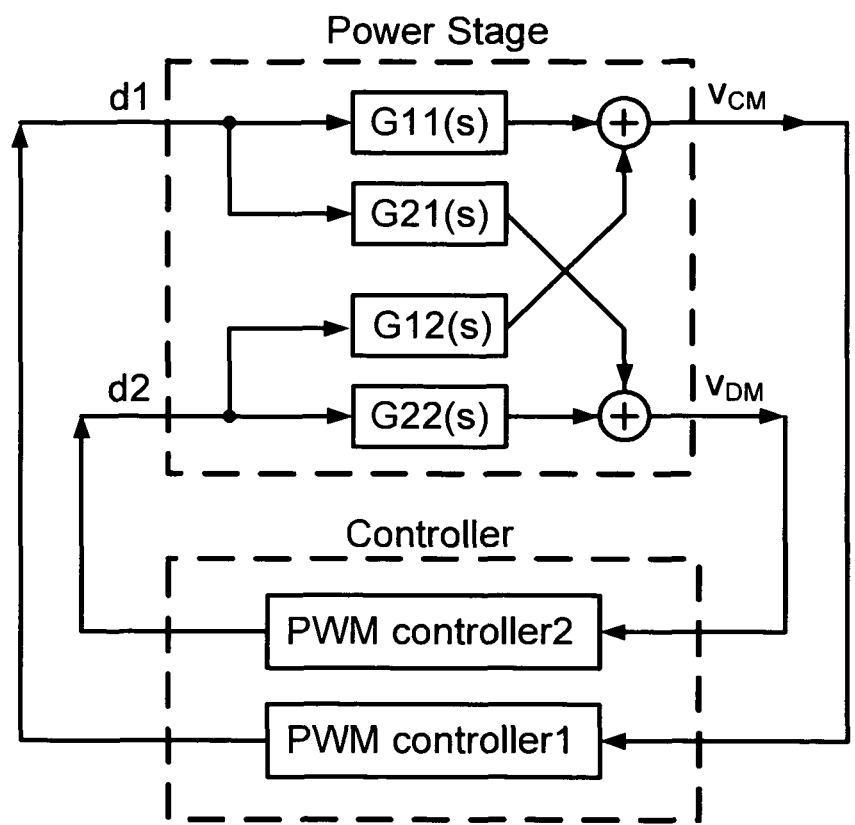
FIG. 3 shows a small signal structure of a SIDO system.
Figure 4:
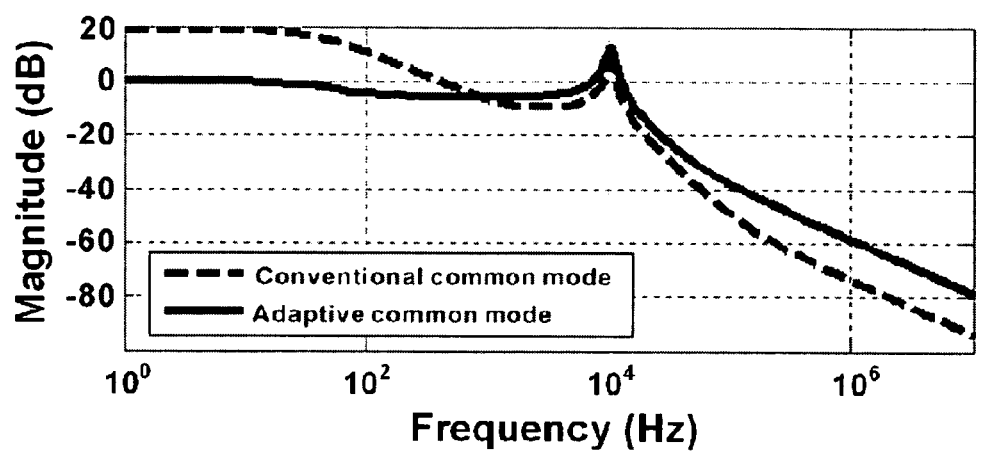
FIG. 4 shows a bode diagram comparison of transfer function $G_{12}(s)$.
Figure 5:
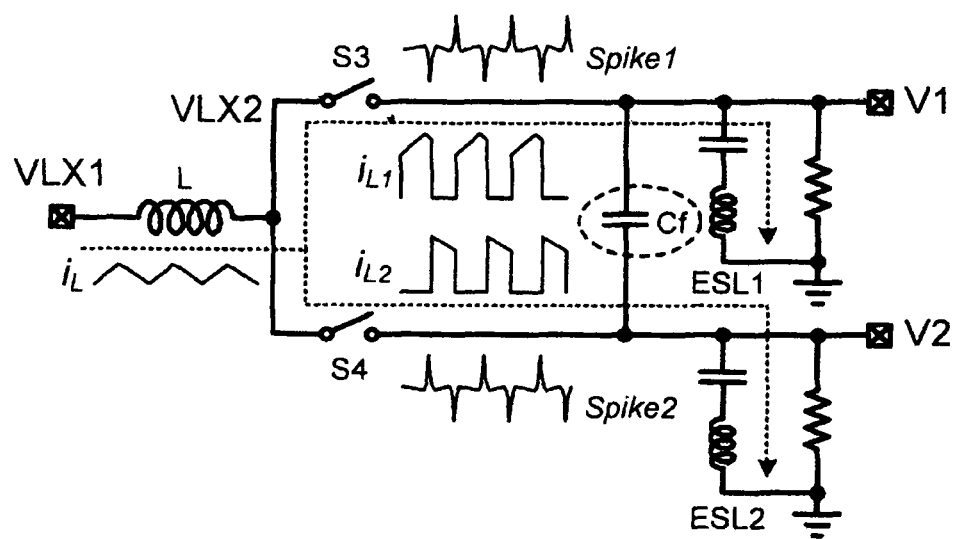
FIG. 5 shows an output stage structure of a SIDO converter with a fly capacitor.
Figure 6:
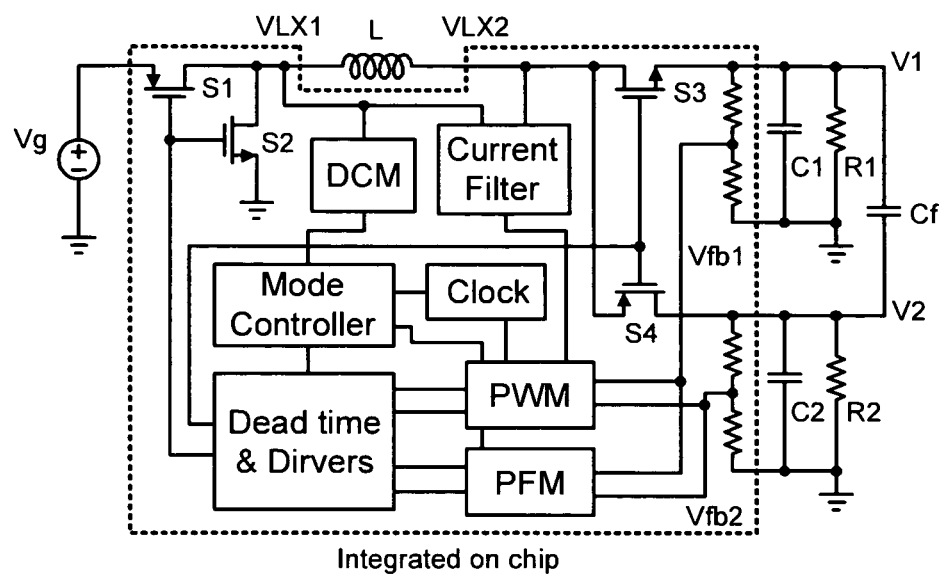
FIG. 6 shows an embodiment of a system block diagram of the proposed SIDO buck converter.

FIG. 6 illustrates an embodiment of a system block diagram of a SIDO buck converter with adaptive common-mode control and fly capacitor method.

The inductor current is sensed by filtering the voltage across the inductor (see reference [7]), which is implemented in the Current Filter block. The mode controller block selects the working mode (PWM or PFM) according to load currents which are detected by duty-ratio-based current estimation (see reference [8]).

Adaptive common mode control is implemented in the pulse-width modulation PWM block. In the visualized embodiment, the output feedback voltages Vfb1 and Vfb2 are derived from the output voltage nodes V1 and V2 via resistive voltage dividers. The DCM block includes a zero current detector to prevent the reverse flow of inductor current. The dead time and drivers block provides the control signals for the power switches. The control signal lines to the power switches are drawn in a simplified manner accordingly. The clock block provides the time base for the operation in PWM mode. For the illustrated SIDO buck converter, the fly capacitor Cf is directly added between the two output nodes.

All the power transistors, control circuits and compensation components may be monolithically implemented. Average current mode control is adopted in the PWM controller to achieve fast response and on-chip compensation. System analysis based on a decoupling small signal model of the SIDO converter has been given in [6].

Figure 7:
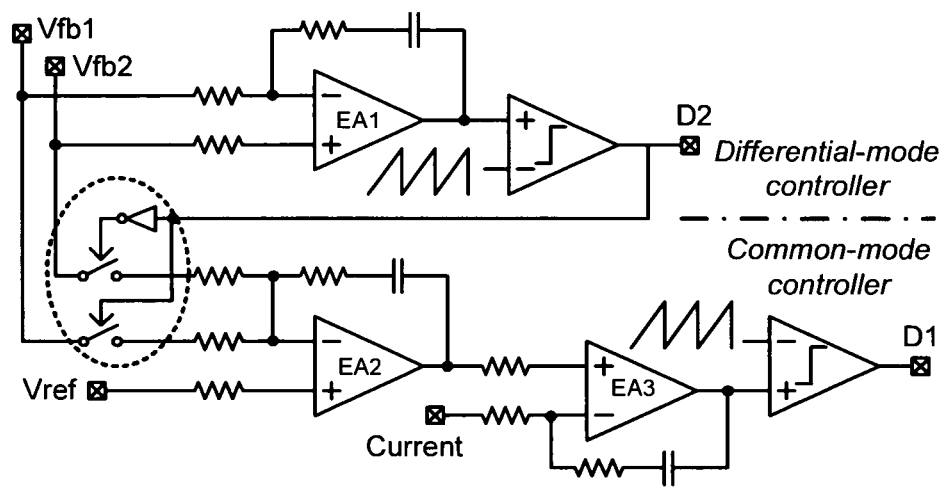
FIG. 7 shows an embodiment of a schematic of the adaptive common-mode PWM controller.

FIG. 7 shows the implementation of the PWM controller that provides the differential mode control signal D2 as well as the common mode control signal D1. The error amplifiers EA1, EA2 and EA3 are implemented via operational amplifiers.

In this embodiment, adaptive common mode is implemented by switches that connect the output feedback voltages Vfb1 and Vfb2 depending on the D2 signal state via inverse-phase controlled switches to the respective inputs of the common mode controller.

The output levels of the error amplifiers EA1 and EA3 are compared to the saw tooth waveform via comparators that generate the D2 and D1 control signals accordingly. A reference voltage is provided to the Vref input. A voltage proportional to the inductor current is provided to the current input. Compensation design of the common-mode and differential-mode loop is introduced in [6].

Figure 8:
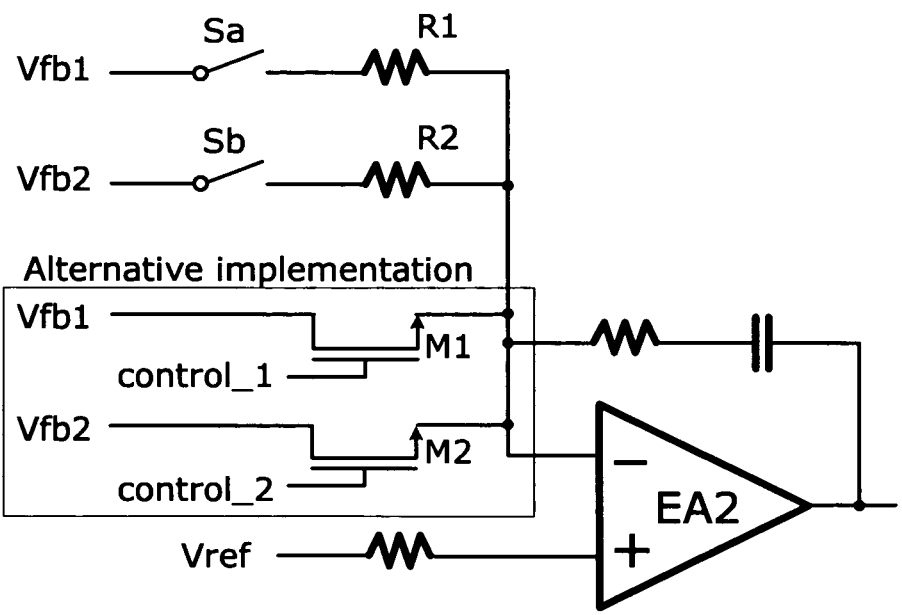
FIG. 8 shows options for weighting the feedback output signals to the common mode controller inputs.

FIG. 8 shows an example for possible implementations of the weighting of the output feedback signals Vfb1 and Vfb2 for the common mode controller inputs to EA2, i.e. adaptive sum by switching and adaptive sum via linear resistors.

As an example, and without loss in generality, said adaptive sum via linear resistors may refer to an adaptive sum via output current relations proportionally controlled resistors or via absolute output currents proportionally controlled resistors (depicted in FIG. 8 alternative implementation without additional correction terms).

The control_1 and control_2 inputs may here be controlled via output current relations proportional or absolute output current proportional voltage values. Transistors M1 and M2 may be operated in the triode region.

Figure 9:
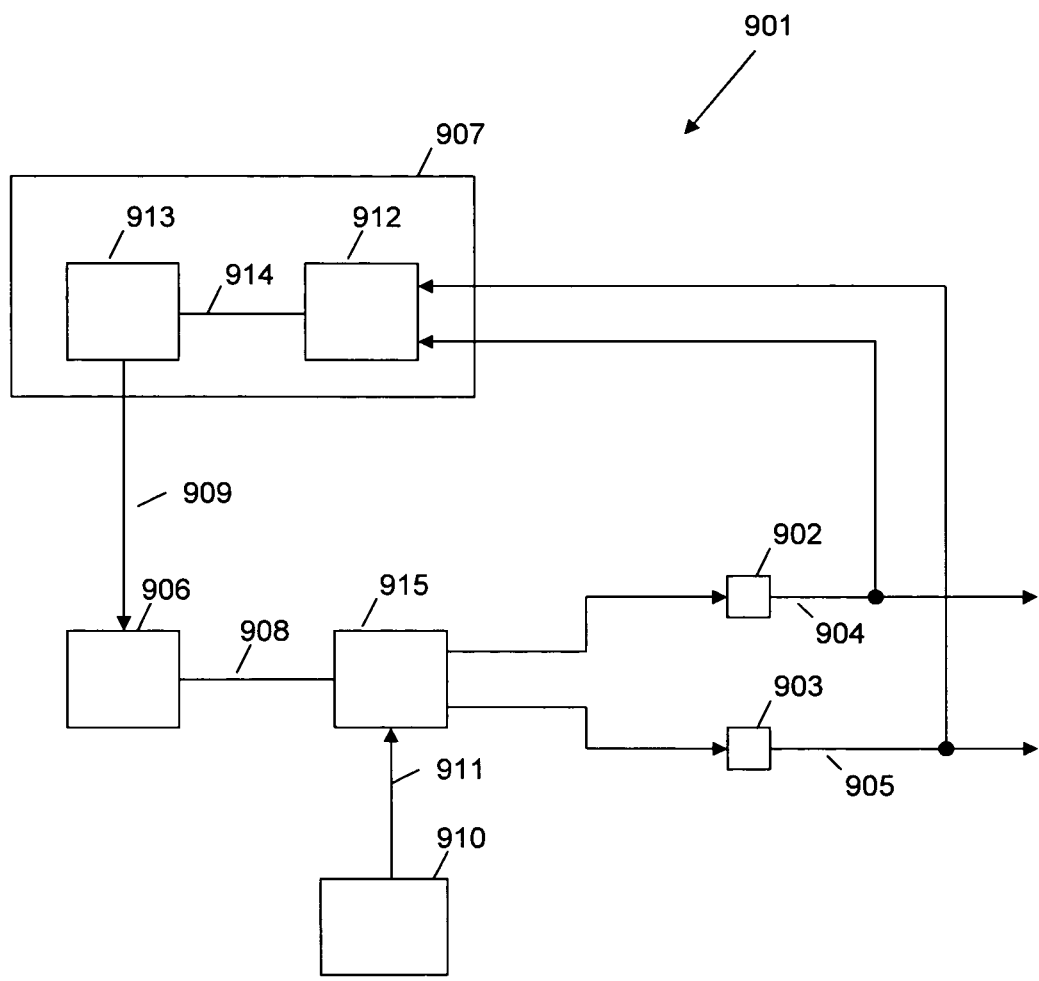
FIG. 9 shows a first embodiment of a switching converter.

FIG. 9 shows a first embodiment of a switching converter 901.

The switching converter 901 of FIG. 9 has two outputs, namely a first output 902 and a second output 903. The first output 902 is configured to provide a first output signal 904. Further, the second output 903 is configured to provide a second output signal 905. Furthermore, the switching converter 901 has one single inductor 906.

The switching converter 901 has a first controlling device 907. Said first controlling device 907 is configured to control the total energy 908 flowing over the inductor 906 to the two outputs 902, 903 dependent on a first control signal 909.

Moreover, the switching converter 901 has a second controlling device 910. Said second controlling device 910 is configured to distribute the total energy 908 between the two outputs 902, 903 by means of at least one second control signal 911.

As shown in FIG. 9, the first controlling device 907 is coupled to the two outputs 902, 903. So, the first controlling device 907 is configured to receive the feedback output signals 904 and 905.

Said first controlling device 907 has first means 912 and second means 913. Said first means 912 are adapted to weight the two feedback output signals 904 and 905. Said second means 913 are configured to provide the first control signal 909 dependent on the two weighted feedback output signals 914 as provided by said first means 912.

For example, the first controlling device 907 is a common mode controller. The second controlling device 910 is exemplarily a differential mode controller.

For switching or distributing the total energy 908, switching means 915 are coupled between the inductor 906 and the outputs 902, 903.

The switching means 915 are configured to switch the total energy 908 to the outputs 902 and 903. The second controlling device 910 controls said switching means 915 by means of the second control signal 911. Exemplarily, said switching means 915 may have a first switch coupled to the output 902 and a second switch coupled to the output 903.

Figure 10:
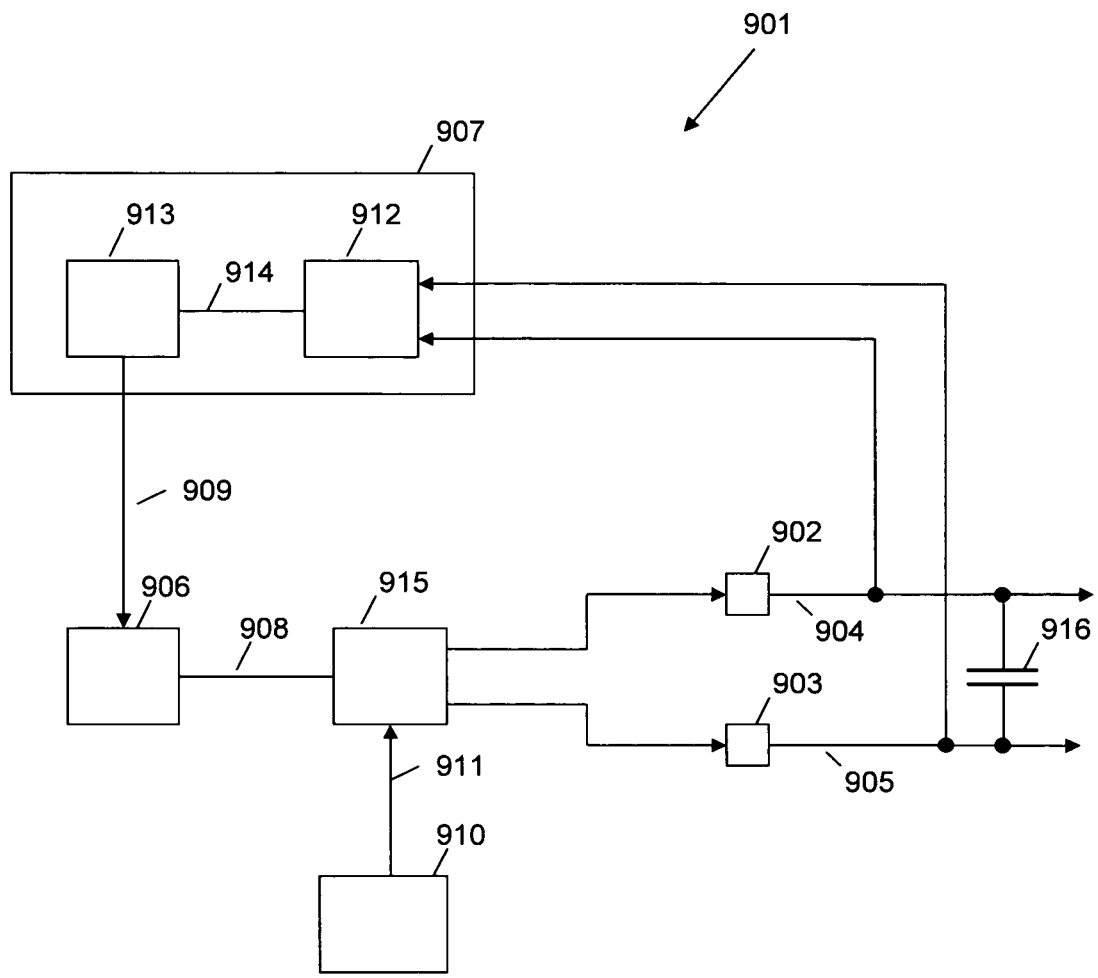
FIG. 10 shows a second embodiment of a switching converter.

In FIG. 10, a second embodiment of the switching converter is depicted. The switching converter 901 of FIG. 10 has all features of the switching converter of FIG. 9. Additionally, the switching converter 901 of FIG. 10 has a coupling capacitor 916. The coupling capacitor 916 is coupled between the two outputs 902, 903, such that the two outputs 902 and 903 have reverse ripples and spikes.

Figure 11B:
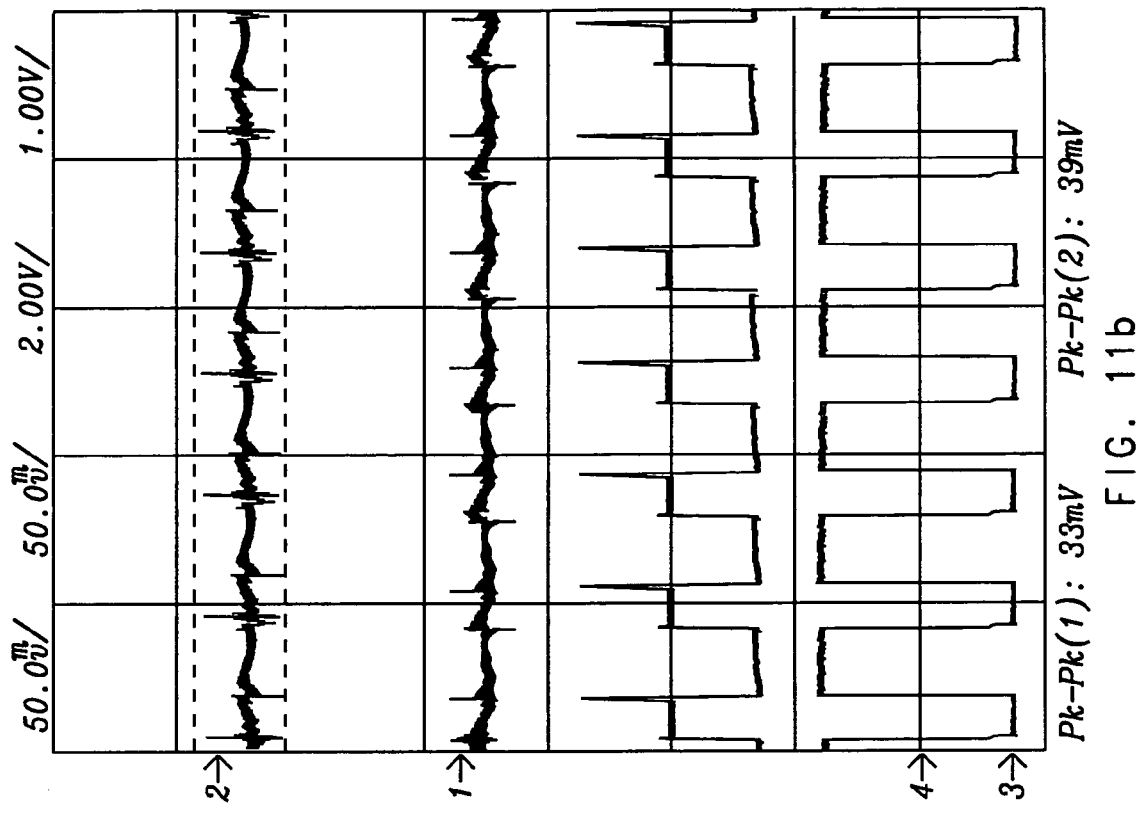
FIG. 11 shows PWM mode measured waveforms of output ripples and nodes VLX1 and VLX2 at heavy loads $I_1$=400 mA, $I_2$=200 mA, FIG. 11(a) without $C_f$, FIG. 11(b) with $C_f$.
Figure 11A:
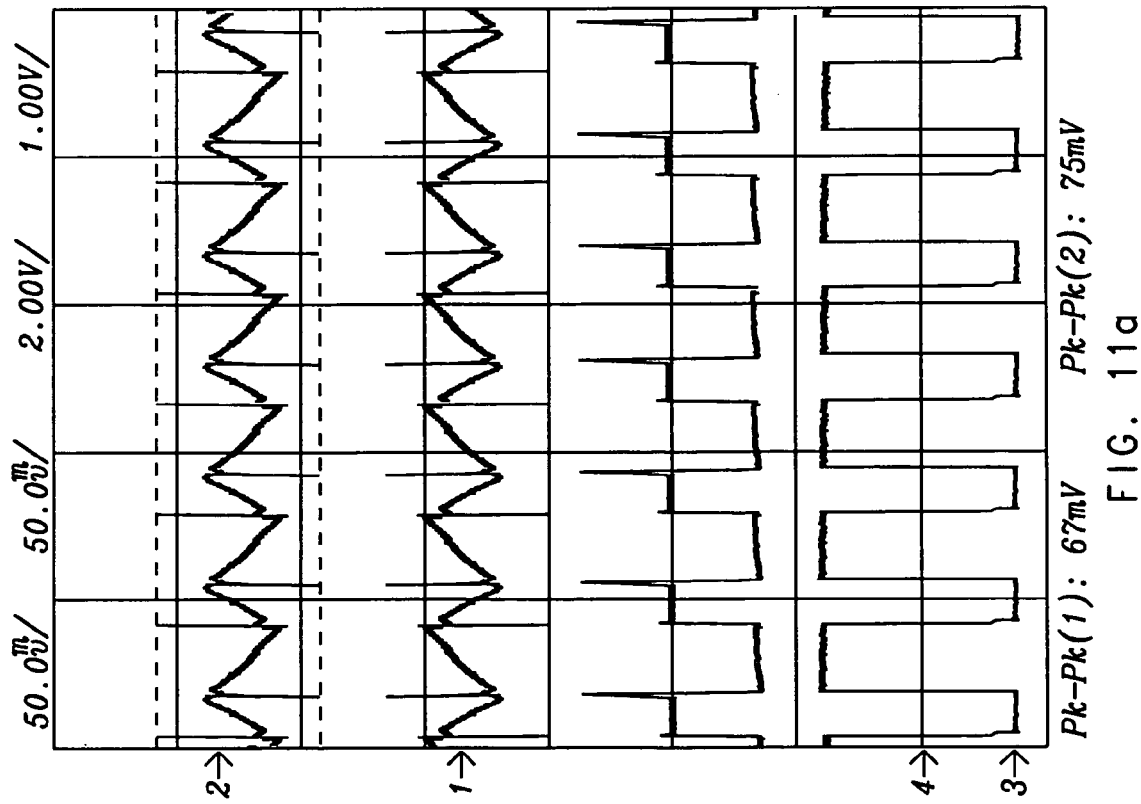

FIG. 11 shows PWM mode detail views of the output voltages V1 and V2 to visualize the voltage ripples and spikes together with the VLX1 and VLX2 voltages at the inductor terminals.

In particular, FIG. 11($a$) shows the measurement results without a fly capacitor, wherein FIG. 11($b$) shows the measurement results with a fly capacitor (Cf=3 µF) between the output voltage nodes. By adding a fly capacitor, the voltage ripples and spikes are reduced by around 50% in PWM mode.

FIG. 12 shows the PFM mode detail views of the output voltages V1 and V2 to visualize the voltage ripples and spikes together with the VLX1 and VLX2 voltages at the inductor terminals.

FIG. 12($a$) shows the measurement results without a fly capacitor, wherein FIG. 12($b$) shows the measurement results with a fly capacitor (Cf=3 µF) between the output voltage nodes. By adding a fly capacitor, the voltage ripples and spikes may be reduced by 20 to 30% in PFM mode.

Figure 13:
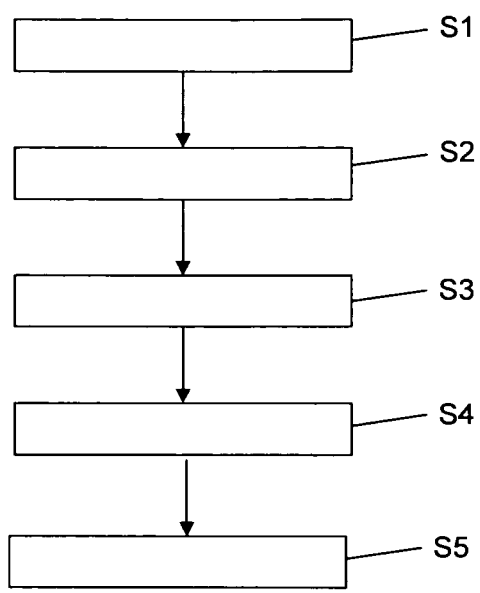
FIG. 13 shows an embodiment of a method for controlling a switching converter; and Like or functionally alike elements in the figures have been allocated the same reference signs if not otherwise indicated.

In FIG. 13, an embodiment of a method for controlling a switching converter is depicted. The switching converter comprises a plurality N of outputs providing N output signals and at least one inductor.

In step S1, the total energy flowing over the inductor to the N outputs is controlled dependent on a first control signal. The first control signal may be provided by a first controlling device.

In step S2, the total energy flowing over the inductor is distributed between the N outputs dependent on at least one second control signal. The at least one second control signal may be provided by a second controlling device.

In step S3, a number M of feedback output signals of the N output signals, M≤N, are received by means of the first controlling device the In step S4, the M feedback output signals are weighted.

In step S5, the first control signal is provided dependent on the weighted M feedback output signals.

The present application shows a novel fly capacitor method and adaptive common-mode control for SIDO switching converters. Both, PWM and PFM controls may be implemented. Measurements on a test chip demonstrate low ripples and spikes, suppressed cross regulations, fast response and improved efficiency. The proposed SIDO converter may be suitable for cost-effective power management of portable applications.

What may have been described herein is merely illustrative of the application of the principles of the present invention. Further arrangements and systems may be implemented by those skilled in the art without departing from the scope and spirit of this invention.

REFERENCES

[1] D. Ma, W. H. Ki, C. Y. Tsui, P. K. T. Mok, "Single-inductor multiple-output switching converters with time-multiplexing control in discontinuous conduction mode", IEEE J. Solid-State Circuits, Vol. 38, No. 1, pp. 89-99, January 2003

[2] D. Ma, W. H. Ki, C. Y. Tsui, "A pseudo-CCM/DCM SIMO switching converter with freewheel switching", IEEE J. Solid-State Circuits, Vol. 38, No. 6, pp. 1007-1014, January 2003

[3] H. P. Le, C. S. Chae, K. C. Lee, etc., "A single-inductor switching DC-DC converter with five outputs and ordered power-distributive control", IEEE J. Solid-State Circuits, Vol. 42, No. 12, pp. 2706-2714, December 2007

[4] D. Trevisan, P. Mattavelli, P. Tenti, "Digital control of single-inductor dual-output DC-DC converters in continuous conduction mode", IEEE 36th Power Electronics Specialists Conference, pp. 2616-2622, 2005

[5] M. Belloni, E. Bonizzoni, etc, "A 4-Output single-inductor DC-DC buck converter with self-boosted switch drivers and 1.2 A total output current", IEEE ISSCC Dig. Tech. Papers, pp. 444-445, 2008

[6] W. Xu, X. Zhu, Z. Hong and D. Killat, "Design of single-inductor dualoutput switching converters with average current mode control", IEEE Asia Pacific Conference on Circuits and Systems, pp. 902-905, 2008

[7] E. Dallago, M. Passoni, and B. Sassone, "Lossless current sensing in lowvoltage high-current DC/DC modular supplies", IEEE Trans. Industrial Electronics, Vol. 47, No. 6, December 2000

[8] Weiwei Xu et al., "A Dual-Mode Single-Inductor Dual-Output Switching Converter With Small Ripple", IEEE TRANSACTIONS ON POWER ELECTRONICS, VOL. 25, NO. 3, MARCH 2010]

The invention claimed is:

1. A switching converter having a plurality N of outputs providing N output signals, wherein N is an integer number N>1, and at least one inductor, comprising:
a first controlling device for controlling the total energy flowing over the inductor to the N outputs dependent on a first control signal, wherein the first controlling device is a common mode controller and wherein the common mode controller is configured for adaptive control mode by switches that connect the output feedback voltages depending on an output signal of the common mode controller via inverse-phase controlled switches the respective inputs of the common-mode controller;
at least a second controlling device for distributing the total energy between the N outputs by means of at least a second control signal, wherein the second controlling device is a differential mode controller receiving output feedback voltages;
wherein the first controlling device is coupled to all N outputs for receiving a number M of the respective feedback output signals of the N outputs, M≤N,
wherein the first controlling device comprises first means for weighting the M feedback output signals and second means for providing the first control signal dependent on the weighted M feedback output signals and wherein the first means are adapted to weight the M feedback output signals by means of at least one output current of a respective output signal.

2. A switching converter according to claim 1, wherein the switching converter comprises one single inductor.

3. A switching converter according to claim 1, wherein the first means are adapted to weight the M feedback output signals by means of the at least one second control signal.

4. A switching converter according to claim 1, wherein the first means are adapted to weight the M feedback output signals by means of M output currents of the M output signals.

5. A switching converter according to claim 1, wherein the first means are adapted to weight the M feedback output signals by means of the at least one second control signal and of at least one output current of a respective output signal.

6. A switching converter according to claim 1, wherein said first means are configured to weight the respective feedback output signal of the M feedback output signals in dependence on the respective length of a time period in which the respective output providing said respective feedback output signal is connected to the inductor.

7. A switching converter according to claim 1, wherein said first means are configured to weight the M feedback output signals by using adjustable resistors arranged in a feedback path between said outputs and said first controlling device.

8. A switching converter according to claim 1, wherein said first means are configured to weight the M feedback output signals by using at least one transfer function.

9. A switching converter of claim 8, wherein said transfer function is a linear transfer function, quadratic transfer function, an exponential transfer function, a square route transfer function or a combination of these functions.

10. A switching converter of claim 9, wherein said transfer function is controlled via at least one second control signal.

11. A switching converter of claim 9, wherein said transfer function is controlled via at least one output current of a respective output signal.

12. A switching converter of claim 9, wherein said transfer function is controlled in dependence on a respective length of a time period in which the respective output providing said output signal is connected to the inductor.

13. A switching converter of claim 9, wherein said transfer function is controlled in dependence on a respective length of a time period in which a different output as the respective output providing said output signal is connected to the inductor.

14. A switching converter according to claim 1, wherein a coupling capacitor is coupled between two respective outputs of a number T of selected outputs of the plurality N outputs, T≤N, such that the two respective outputs have reverse ripples and spikes.

15. A switching converter according to claim 1, wherein the switching converter has two outputs providing output signals, N=2, wherein a coupling capacitor is coupled between the two outputs, wherein the switching of the two outputs is inverse-phased.

16. A switching converter according to claim 15, wherein controllable coupling capacitors are arranged between two respective outputs, which are to be controlled effective during phases of inverse switching.

17. A switching converter according to claim 14, wherein said respective coupling capacitor is controllable in a resistive manner, in particular by a switch.

18. A method for controlling a switching converter having a plurality N of outputs providing N output signals, wherein N is an integer number N>1, and at least one inductor, comprising:
controlling the total energy flowing over the inductor to the N outputs by means of a first controlling device dependent on a first control signal, wherein the first controlling device is a common mode controller and wherein the common mode controller is configured for adaptive control mode by switches that connect the output feedback voltages depending on an output signal of the common mode controller via inverse-phase controlled switches the respective inputs of the common-mode controller;
distributing the total energy between the N outputs by means of at least a second controlling device and of at least a second control signal, wherein the second controlling device is a differential mode controller receiving output feedback voltages;
receiving a number M of feedback output signals of the N output signals, M≤N, by means of the first controlling device;
weighting the M feedback output signals by means of at least one output current of a respective output signal; and
providing the first control signal dependent on the weighted M feedback output signals.

19. A Switching converter according claim 14, wherein controllable coupling capacitors are arranged between two respective outputs, which to be controlled effective during phases of inverse switching.

20. A Switching converter according to claim 19, wherein said respective coupling capacitor is controllable in a resistive manner, in particular by a switch.

21. A Switching converter according to claim 15, wherein said respective coupling capacitor is controllable in a resistive manner, in particular by a switch.

22. A Method for controlling switching converter according claim 18, further comprising implementing adaptive control mode by switches that connect the output feedback voltages depending on an output signal of the differential mode controller via inverse-phase controlled switches the respective inputs of the first controlling device.

* * * * *